(12) United States Patent
Tanaka et al.

(10) Patent No.: US 6,184,756 B1
(45) Date of Patent: Feb. 6, 2001

(54) MODULATOR

(75) Inventors: Koichiro Tanaka, Takarazuka; Hiroshi Oue, Neyagawa; Kazuhiro Shouno, Kawanishi, all of (JP)

(73) Assignee: Matsushita Electric Industrial Co., Ltd., Osaka-Fu (JP)

(*) Notice: Under 35 U.S.C. 154(b), the term of this patent shall be extended for 0 days.

(21) Appl. No.: 09/119,644

(22) Filed: Jul. 21, 1998

(30) Foreign Application Priority Data

Jul. 24, 1997 (JP) .................................................. 9-198919

(51) Int. Cl.[7] .................................................. H04L 27/36
(52) U.S. Cl. .......................... 332/103; 332/104; 455/110; 455/118; 375/295; 375/298; 375/261; 375/271
(58) Field of Search .................................. 332/103, 104, 332/161, 159; 375/295, 271, 261, 298; 455/110, 118

(56) References Cited

U.S. PATENT DOCUMENTS 5,519,732  *  5/1996  Chester ................................ 375/295
5,600,678     2/1997  Petranovich et al. ................ 375/798
5,783,974  *  7/1998  Koslov et al. ....................... 332/103

FOREIGN PATENT DOCUMENTS 6-152675   5/1994   (JP) .
6-244883   9/1994   (JP) .

OTHER PUBLICATIONS

"Analog Filter Design", by M.E. Van Valkenburg, 1982.

* cited by examiner

Primary Examiner—Arnold Kinkead
(74) Attorney, Agent, or Firm—Wenderoth, Lind & Ponack, LLP.

(57) ABSTRACT

A low frequency signal generating portion 1 generates a first discrete signal (a signal sampled at a first sampling rate $f_1$). A band pass portion 2 operates at a second sampling rate $f_2$, performs a frequency selecting operation to a second discrete signal generated when the first discrete signal generated by the low frequency signal generating portion 1 is inputted, and generates a modulated signal with a prescribed center frequency.

7 Claims, 14 Drawing Sheets

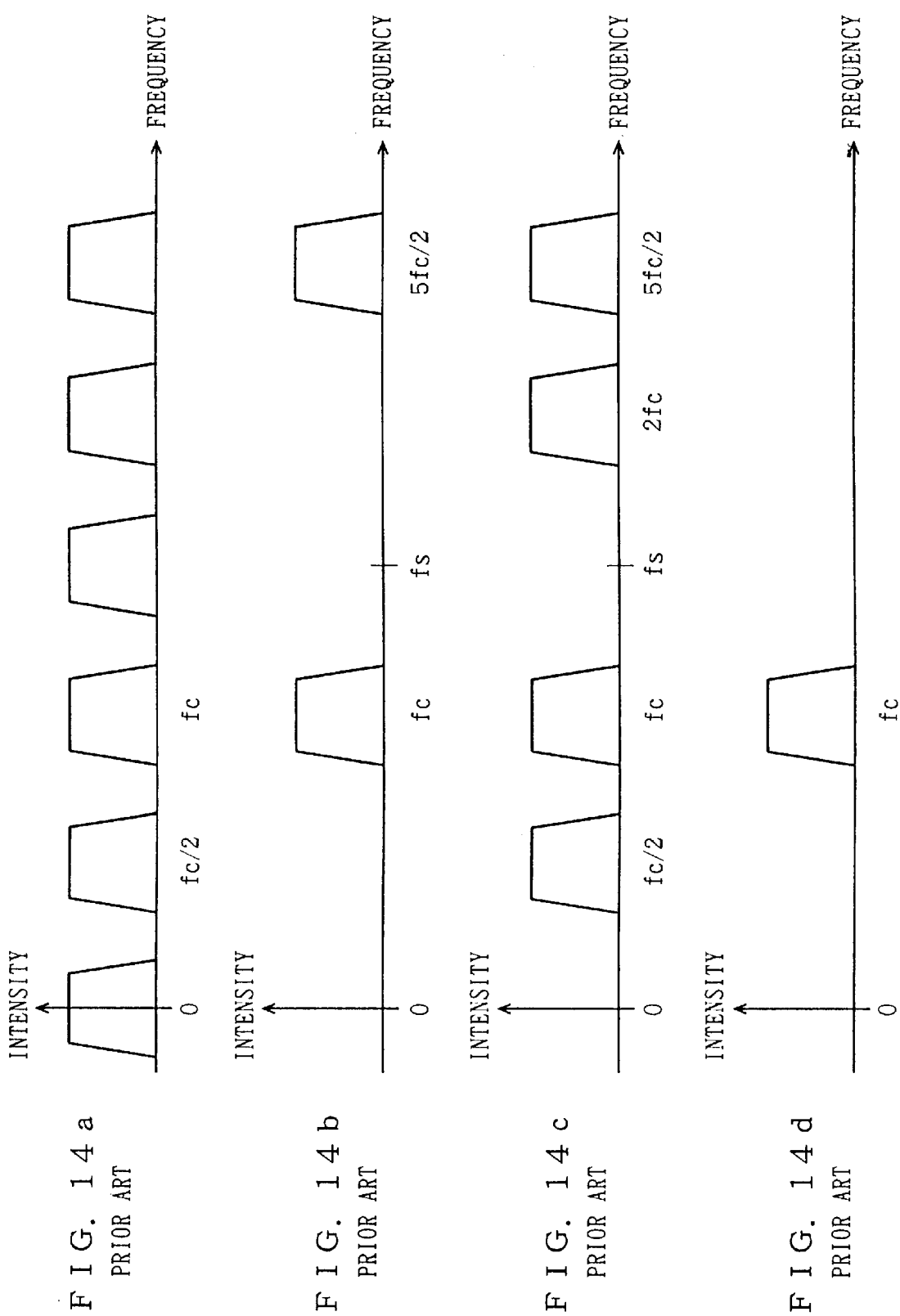

MODULATOR

BACKGROUND OF THE INVENTION

1. Field of the Invention

This invention relates to modulators, and more specifically to a modulator for modulating a carrier wave with a transmission signal to be transmitted.

2. Description of the Background Art

First, a modulator disclosed in Japanese Patent Laying-Open No. 6-152675 (hereinafter referred to as "first modulator") is described in reference to FIG. 12 which shows its block structure. In FIG. 12, the first modulator is a device for modulating a carrier wave with a transmission signal to generate a modulated signal. It includes a quadrature base band generator 71, a quadrature polar coordinate converter 72, a phase accumulator 73, an adder 74, a sine wave table memory 75, a multiplier 76, and a D/A converter 77.

The quadrature base band generator 71 converts an inputted digital signal into a quadrature base band signal. When a modulated signal is represented as the synthesis of two carriers orthogonal to each other, the quadrature base band signal represents the amplitude and the phase of these carriers. The quadrature polar coordinate converter 72 converts the quadrature base band signal into a phase modulating signal and an amplitude modulating signal. When the modulated signal is represented in a polar coordinate system, the phase modulating signal and the amplitude modulating signal represent the phase and the amplitude of the modulated signal. The adder 74 adds the phase modulating signal to an output of the phase accumulator 73. The sine wave table memory 75 outputs a carrier signal of a sine wave based on an output from the adder 74. The multiplier 76 multiplies the carrier signal by the amplitude modulating signal. Thus, the first modulator generates a modulated signal with prescribed variations in phase and amplitude.

Next, a modulator disclosed in Japanese Patent Laying-Open No. 6-244883 (hereinafter referred to as "second modulator") is described referring to FIG. 13 which shows its block structure and FIGS. 14a to 14d showing the output waveforms from each of its components.

In FIG. 13, the modulator includes a signal point arranging circuit 81, a complex coefficient BPF (Band Pass Filter) 82, a latch 83, a D/A converter 84, and an analog BPF 85, and performs modulation without generating a trigonometric function.

The signal point arranging circuit 81 outputs a quadrature base band signal. The quadrature base band signal is a signal sampled at a sampling rate $f_c/2$, and has harmonic components of an integral multiple of $f_c/2$, as shown in FIG. 14a. The complex coefficient BPF 82 converts the quadrature base band signal into a complex band signal for selecting a prescribed frequency band. Therefore, as shown in FIG. 14b, only the components of the quadrature base band signal within the prescribed frequency band are selected. The latch circuit 83 and the D/A converter 84 multiply a real signal component of the complex band signal by a pulse whose duty ratio is smaller than 1 to perform a pulse amplitude modulation. The analog band pass filter 85 extracts a desired harmonic component from the output of the D/A converter 84. Since the D/A converter 84 converts only the real signal component, the output signal from the D/A converter 84 causes aliasing components as shown in FIG. 14C. These aliasing components are the result of the signal shown in FIG. 14b being folded at an operating frequency of the complex coefficient BPF 82, $f_s$. The analog BPF 85 only extracts a prescribed harmonic component of the output signals from the D/A converter 84 to generate a modulated signal as shown in FIG. 14d.

As described above, the first modulator has one trigonometric function generating portion composed of the phase accumulator 73 and the sine wave table memory 75. The trigonometric function generating portion operates with a clock rate of at least more than double the frequency of the above carrier signal (the center frequency of the modulating signal). As a result, it is necessary for the first modulator to operate the trigonometric function generating portion, a complex circuit, with a frequency of at least more than double the modulating wave frequency, which disadvantageously results in an increase in circuit size and power consumption.

As in the second modulator, it is possible to construct a modulator without using a trigonometric function generating portion. However, in this case, since an analog band pass filter is required, it is not suitable for integration as a circuit. Further, in the second modulator, the center frequency of the modulating signal is limited to an integer multiple of fc/2, it cannot be changed easily.

SUMMARY OF THE INVENTION

Therefore, an object of the present invention is to provide a modulator allowing for a small circuit size and low power consumption, capable of simple variations to the center frequency of a modulating signal and further suitable for integration as a circuit.

A first aspect of the present invention is a device for modulating a carrier wave with a transmission signal to be transmitted, including:

a discrete signal generating portion for sampling the transmission signal inputted from an outside source at a first sampling rate and generating a discrete signal; and a band pass portion operating at a second sampling rate which is higher than the first sampling rate, when the discrete signal generated in the discrete signal generating portion is inputted and executing a band selection for selecting a signal which exists in a prescribed frequency band.

In the first aspect of the invention, since the band pass portion operates at the second sampling rate, inputting a discrete signal sampled at the first sampling rate is the same as inputting a discrete signal obtained by sampling the first discrete signal at the second sampling rate. The band pass portion executes band selection with respect to the discrete signal, selecting only a signal which exists in a prescribed frequency band as a modulated signal (a signal obtained by modulating a carrier with the transmission signal to be transmitted).

As described above, the band pass portion operates at the second sampling rate and simply executes the band selecting operation. Now assume that the trigonometric function generating portion of the conventional modulator operates at the second sampling rate. The structure of the trigonometric function generating portion is more complex than that of the band pass portion. Thus, power consumption of the band pass portion is small compared with that of the trigonometric function generating portion. Further, since the discrete signal generating portion preceding the band pass portion operates at the first sampling rate which is relatively low, it is possible to make the power consumption low.

Further, in the first aspect, unlike the conventional modulator, it is possible to generate a modulating signal without using the trigonometric function generating portion whose circuit structure is complicated.

Therefore, in accordance with the first aspect, it is possible to make the modulator's circuit size small and its power consumption low.

According to a second aspect of the invention, which further refines the first aspect, the discrete signal generating portion includes a low pass filter operating at the first sampling rate when the transmission signal is inputted from an outside source and passing only a signal which exists in low frequencies.

As described above, the discrete signal generating portion generates a discrete signal using only a low pass filter which operates at the first sampling rate. Therefore, in accordance with the second aspect, it is possible to make the modulator's circuit size small and its power consumption low.

According to a third aspect of the invention, which further refines the first aspect, the transmission signal is previously band-limited. The discrete signal generating portion includes an interpolating filter for, when the transmission signal is inputted from an outside source, interpolating the transmission signal at the first sampling rate.

As described above, the discrete signal generating portion generates a discrete signal using only an interpolating filter for interpolating the transmission signal at the first sampling rate. Therefore, in accordance with the third aspect, it is possible to make the modulator's circuit size small and its power consumption low.

According to a fourth aspect of the invention, which further refines the first aspect, the transmission signal is previously band-limited and sampled at the first sampling rate. The discrete signal generating portion includes a trigonometric function generating portion for generating a trigonometric function with a prescribed frequency, and a multiplying portion for, when the transmission signal is inputted from an outside source, multiplying the transmission signal by the trigonometric function generated in the trigonometric function generating portion.

In accordance with the fourth aspect, since the discrete signal generating portion includes a trigonometric function generating portion and a multiplying portion, it is possible to freely shift the center frequency of the discrete signal. Thus, it is possible to arbitrarily set the center frequency of the modulating signal. The trigonometric function generating portion and the multiplying portion are structural components of the discrete signal generating portion and operate at the first sampling rate which is relatively low, also allowing for low power consumption.

According to a fifth aspect of the invention, which further refines the first aspect, the discrete signal generating portion includes a low pass filter for, when the transmission signal is inputted from an outside source, passing only a signal which exists at low frequencies, and an interpolating filter for interpolating the transmission signal which was band-limited by the low pass filter at the first sampling rate.

In accordance with the fifth aspect, since the discrete signal generating portion includes the low pass filter and the interpolating filter, the transmission signal does not have to be band-limited nor sampled at the first sampling rate. As a result, the usability of the modulator improves. Further, unlike the conventional modulator, it is possible to generate a modulating signal without using the trigonometric function generating portion with a complicated circuit structure. Therefore, in accordance with the fifth aspect, it is possible to make the circuit size small and power consumption low compared to the conventional modulator.

According to a sixth aspect of the invention, which further refines the first aspect, the discrete signal generating portion includes a low pass filter for, when the transmission signal is inputted from an outside source, operating at the first sampling rate and passing only a signal which exists at low frequencies, a trigonometric function generating portion for generating a trigonometric function with a prescribed frequency, and a multiplying portion for multiplying an output signal from the low pass filter by the trigonometric function generated in the trigonometric function generating portion.

In accordance with the sixth aspect, since the discrete signal generating portion includes the low pass filter, the transmission signal does not have to be band-limited. Thus, this improves the usability of the modulator. Further, since the discrete signal generating portion includes the trigonometric function generating portion and the multiplying portion, as in the fourth aspect, it is possible to arbitrarily set the center frequency of the modulating signal. Furthermore, these portions operate at a relatively low frequency, allowing for low power consumption of the modulator.

According to a seventh aspect of the invention, which further refines the first aspect, the transmission signal is previously band-limited. The discrete signal generating portion includes an interpolating filter for interpolating the band-limited transmission signal inputted from an outside source and then outputting a result at the first sampling rate. The discrete signal generating portion further includes a trigonometric function generating portion for generating a trigonometric function with a prescribed frequency, and a multiplying portion for multiplying an output signal from the interpolating filter by the trigonometric function generated in the trigonometric function generating portion.

In accordance with the seventh aspect, since the discrete signal generating portion includes the interpolating filter, the transmission signal does not have to be sampled at the first sampling rate. Thus, this improves the usability of the modulator. Further, since the discrete signal generating portion includes the trigonometric function generating portion and the multiplying portion, as in the fourth aspect, it is possible to arbitrarily set the center frequency of the modulating signal. Furthermore, these portions operate at a relatively low frequency, allowing for low power consumption of the modulator.

According to an eighth aspect of the invention, which further refines the first aspect, the discrete signal generating portion includes a low pass filter for, when said transmission signal is inputted from an outside source, passing only a signal which exists at low frequencies, an interpolating filter for interpolating the output signal from the low pass filter and then outputting a result at the first sampling rate, a trigonometric function generating portion for generating a trigonometric function with a prescribed frequency, and a multiplying portion for multiplying an output signal from the interpolating filter by the trigonometric function generated in the trigonometric function generating portion.

In accordance with the eighth aspect, since the discrete signal generating portion includes the low pass filter and the interpolating filter, the transmission signal does not have to be band-limited nor sampled at the first sampling rate. This improves usability of the modulator. Further, since the discrete signal generating portion includes the trigonometric function generating portion and the multiplying portion, similar to the fourth aspect, it is possible to arbitrarily set the center frequency of the modulating signal. Furthermore, these portions operate at a relatively low frequency, allowing for low power consumption of the modulator.

According to a ninth aspect of the invention, which further refines the first aspect, the band pass portion includes an IIR filter, and when the discrete signal generated in the discrete signal generating portion is inputted, the IIR filter operates at the second sampling rate and executes the band selection.

In accordance with the ninth aspect, since the band pass portion is composed of the IIR filter, it is possible to reduce the number of taps in the filter compared to an FIR filter in the eleventh aspect of the invention described below, and also to make the circuit size small and power consumption low in the modulator.

According to a tenth aspect of the invention, which further refines the first aspect, the band pass portion includes a leapfrog IIR filter, and when the discrete signal generated in the discrete signal generating portion is inputted, the leapfrog IIR filter operates at the second sampling rate and executes the band selection.

In accordance with the tenth aspect, since the band pass portion is composed of the leapfrog IIR filter, it is possible to reduce the accuracy of the elements comprising the filter compared to the elements of the IIR filter in the ninth aspect of the invention described above, and also to make the circuit size small and power consumption low in the modulator.

According to an eleventh aspect of the invention, which further refines the first aspect, the band pass portion includes an FIR filter, and when the discrete signal generated in the discrete signal generating portion is inputted to the FIR filter, the FIR filter operates at the second sampling rate and executes the band selection.

In accordance with the eleventh aspect, since the band pass portion of the modulator includes the FIR filter, the degree of accuracy of elements composing the filter can be as low as the accuracy being secured at the input/output of the band pass portion. Thus, it is also possible to operate the FIR filter at a high speed.

According to a twelfth, thirteenth, fourteenth and fifteenth aspects of the invention, which further refine the second, fifth, sixth, and eighth aspects, respectively, when the band pass portion includes an IIR filter or an FIR filter, the low pass filter of the discrete signal generating portion has a frequency pass characteristic capable of compensating for a frequency pass characteristic of the IIR filter or the FIR filter.

When the band pass portion is composed of the IIR filter or the FIR filter, there are cases where the amplitude and the phase characteristics of the modulating signal are disturbed. Therefore, in accordance with the twelfth through fifteenth aspects, the band pass filter of the discrete signal generating portion is provided with the above described frequency pass characteristic. This improves the quality of the modulated signal.

According to a sixteenth, seventeenth, eighteenth, and nineteenth aspects of the invention, which further refine the fourth, sixth, seventh, and eighth aspects, respectively, the band pass portion multiplies the currently inputted signal by a coefficient stored therein at the time of executing the band selection. Before the band selection operation is executed, the multiplying portion determines the coefficient based on the trigonometric function generated in the trigonometric function generating portion and the coefficient determined in the multiplying portion is stored in the band pass portion.

As described above, the trigonometric function generating portion and the multiplying portion determine the coefficient of the band pass portion. In accordance with the sixteenth through nineteenth aspects, it is not necessary to have an additional structure for determining the coefficient of the band pass portion, allowing the modulator to have a small circuit size.

According to a twentieth aspect of the invention, which further refines the first aspect, the discrete signal generating portion and the band pass portion are both constructed with elements for executing digital signal processing.

In accordance with the twentieth aspect, since analog elements are not used, the modulator is suitable for integration on a circuit.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 14a to 14d are diagrams showing spectrums of signals outputted from each component included in the modulator shown in FIG. 13.

DESCRIPTION OF THE PREFERRED EMBODIMENTS

Described in detail below are embodiments of the present invention according to the attached drawings.

First Embodiment

Figure 1:
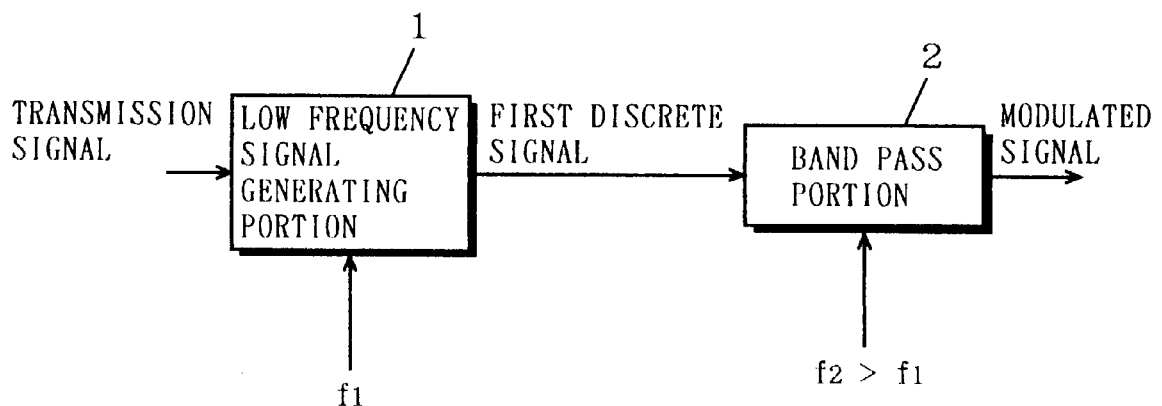
FIG. 1 is a block diagram of a modulator according to a first embodiment of the present invention.

FIG. 1 is a block diagram showing the structure of a modulator according to a first embodiment of the present invention. In FIG. 1, the modulator includes a low frequency signal generating portion 1 (corresponding to "discrete signal generating means" in the claims) and a band pass portion 2.

The low frequency signal generating portion 1 samples a transmitted input signal from an outside source (hereinafter referred to as "transmission signal") at a first sampling rate $f_1$ to generate and output a first discrete signal (corresponding to "discrete signal" in the claims).

Figure 2A:
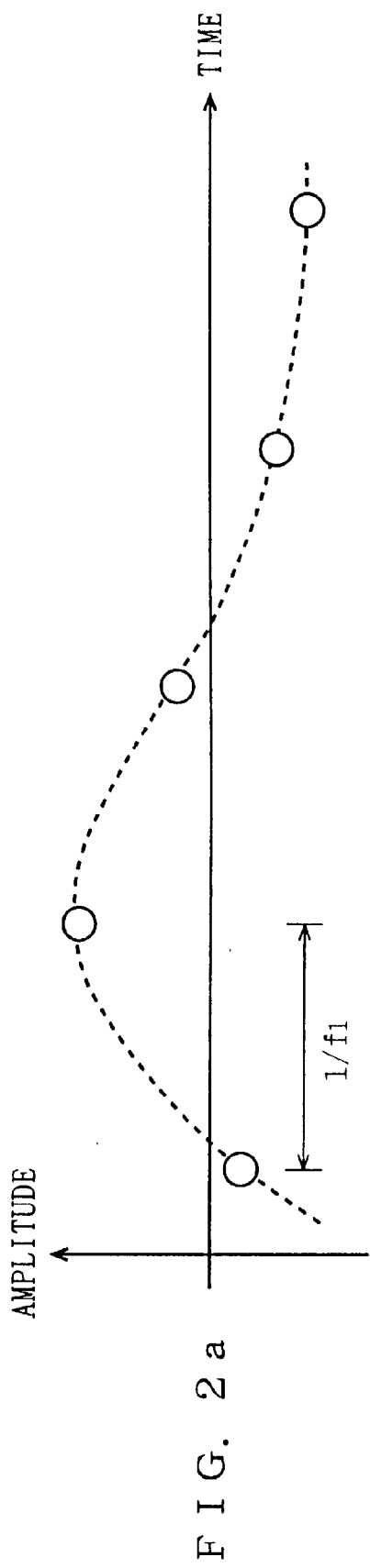
FIGS. 2a and 2b are diagrams showing time waveforms of a first discrete signal and a second discrete signal generated by a low frequency signal generating portion 1 and a band pass portion 2, respectively.
Figure 3A:
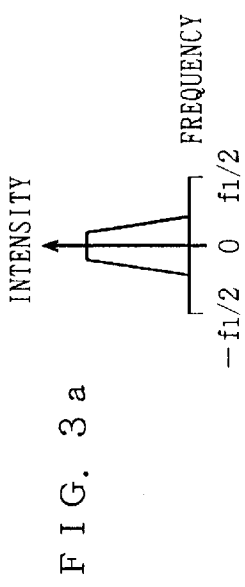
FIGS. 3a to 3c are diagrams showing spectrums of the first discrete signal generated by the low frequency signal generating portion 1, the second discrete signal generated by the band pass portion 2 shown in FIG. 1, and a modulated wave, respectively.

A time waveform of the first discrete signal is shown in FIG. 2a, and a spectrum of the first discrete signal is shown in FIG. 3a. In FIG. 2a, the transmission signal shown by a dotted line in the drawing is sampled as described above, and thus, the first discrete signal is composed of a signal series shown by ○ marks in the drawing. Further, in FIG. 3a, a center of the spectrum of the first discrete signal is at a prescribed frequency (now assumed to be zero "0"). In order to clarify the description, only the spectrum within a frequency band of $\pm f_1/2$ is shown in FIG. 3a.

When the first discrete signal is inputted from the low frequency signal generating portion 1 to the band pass portion 2, the band pass portion 2 operates at a second sampling rate $f_2$ ($f_2 > f_1$) to execute a band selection which will be described later. At this time, the band pass portion 2 operates at $f_2$, resulting in the sampling of the first discrete signal at a second sampling rate $f_2$ and generating a second discrete signal.

Figure 2B:
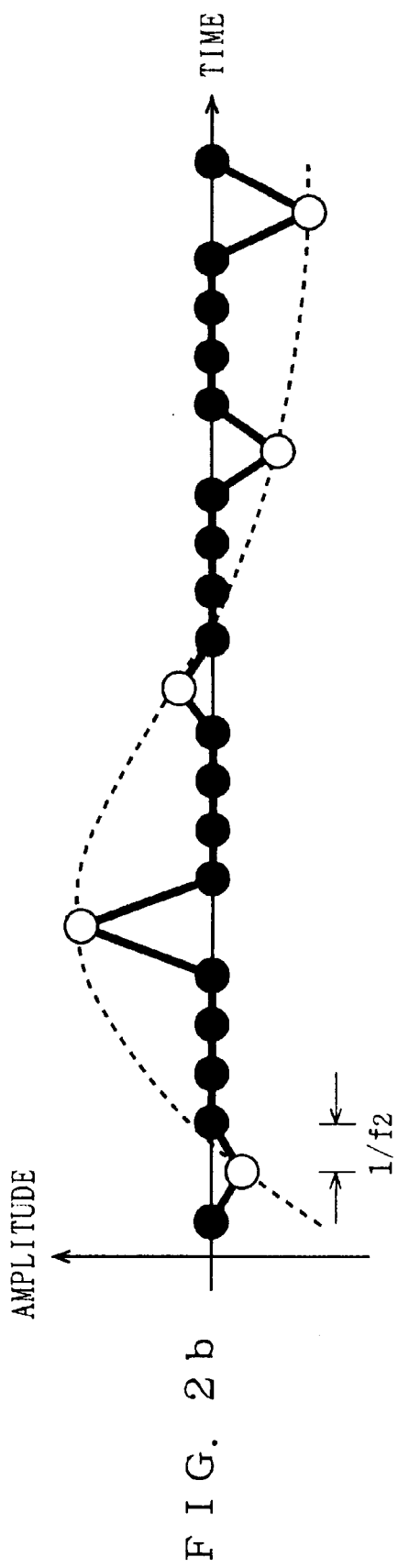
Figure 3B:
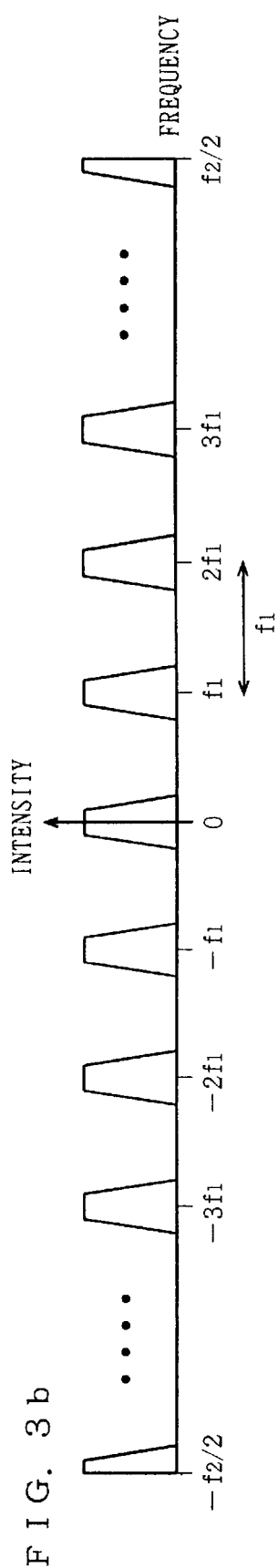

A time waveform of the second discrete signal is shown in FIG. 2b, and a spectrum of the second discrete signal is shown in FIG. 3b. As shown in FIG. 2b, when the first discrete signal is sampled at $f_2$, since $f_2 > f_1$, there are points where no first discrete signal exists. At these points, a "0" corresponds to a respective signal series (refer to ● in the drawing). On the other hand, at points where the first discrete signal exists, a signal series corresponding to the amplitude of the first discrete signal (refer to ○ in FIG. 2b) occurs. Therefore, the waveform of the second discrete signal is composed of signal series shown by ○ and ● in FIG. 2b. Further, in FIG. 3b, the spectrum of the second discrete signal exists at a position obtained by frequency-shifting the spectrum of the first discrete signal (refer to FIG. 3a) by an integral multiple of the frequency $f_1$. In order to clarify the description, only the spectrum which exists within a frequency band between $-f_2/2$ and $+f_2/2$ is shown in FIG. 3b.

Figure 3C:
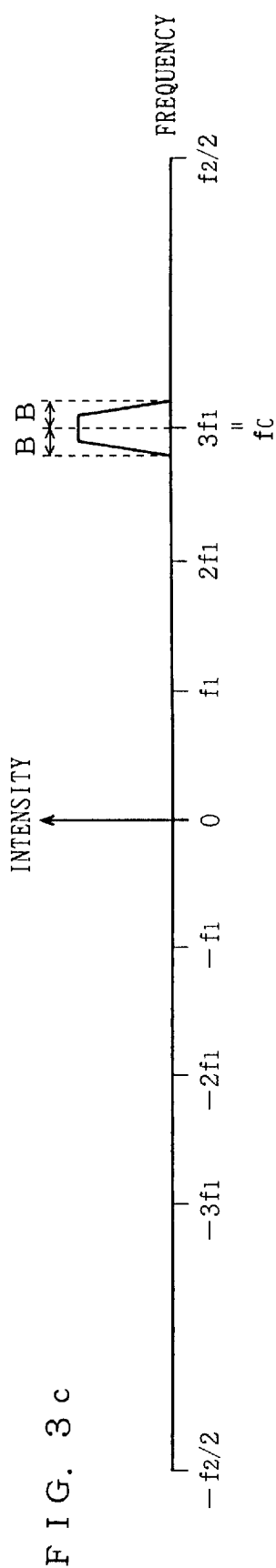

The band pass portion 2 (refer to FIG. 1) selects only components which exist within a prescribed frequency band in the spectrum of the second discrete signal to output as a modulated signal. Now, assuming that the frequency band selected by the band pass portion 2 is from $3f_1 - B$ to $3f_1 + B$, the modulated signal has a spectrum as shown in FIG. 3c. The modulated signal is a signal obtained by modulating a carrier wave of a frequency $3f_1$ using the transmission signal.

Described below is a relationship among the spectrums of the first discrete signal and the modulated signal, the first sampling rate $f_1$, and the second sampling rate $f_2$.

Assume that a center frequency of the modulated signal to be outputted from the modulator is $f_c$, and its occupied frequency bandwidth is $\pm B$ having its center at $f_c$. At this time, at least $2(f_c + B)$ must be selected as $f_2$ according to a sampling theorem. $f_2/n$ is selected as $f_1$ by dividing $f_2$ by an integer n. However, $f_1 > 2B$ is required to prevent interference from an adjacent spectrum.

Figure 4A:
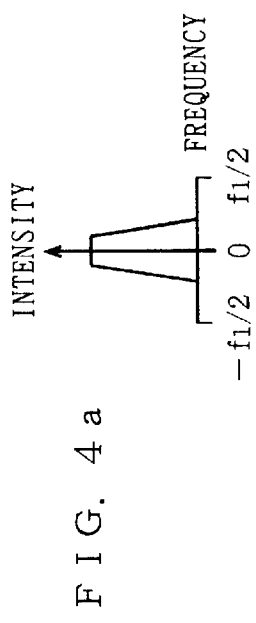
FIGS. 4a and 4b are diagrams showing spectrums of the first discrete signal and the second discrete signal when the center frequency of the first discrete signal is 0, respectively.
Figure 4B:
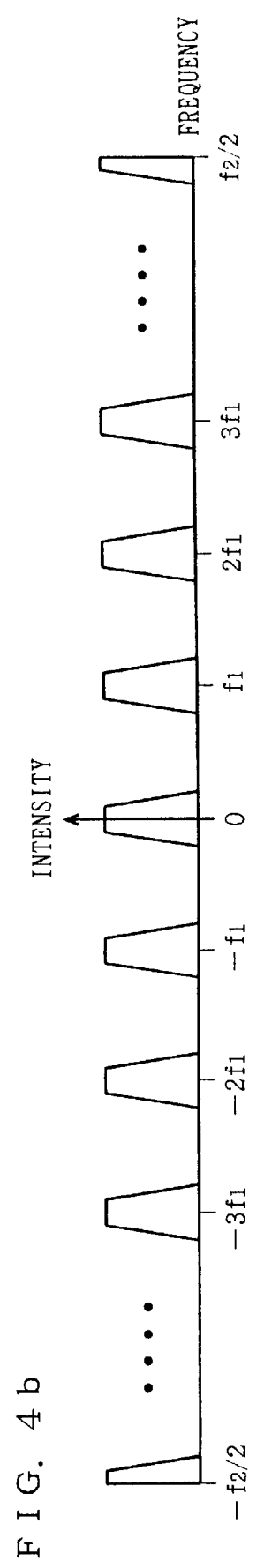

When the spectrum of the first discrete signal has a center at a frequency "0" as shown in FIG. 4a, the center of the spectrum of the second discrete signal obtained by sampling the first discrete signal at $f_2$ appears at the positions shown in FIG. 4b. These positions are obtained as integer multiples of $f_1$ based on the center frequency of the first discrete signal. That is, when k is assumed to be an appropriate integer, $f_c/k$ is selected as $f_1$.

Figure 5A:
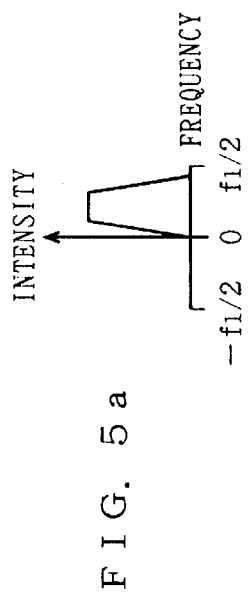
FIGS. 5a and 5b are diagrams of spectrums of the first discrete signal and the second discrete signal when the center frequency of the first discrete signal is not 0, respectively.
Figure 5B:
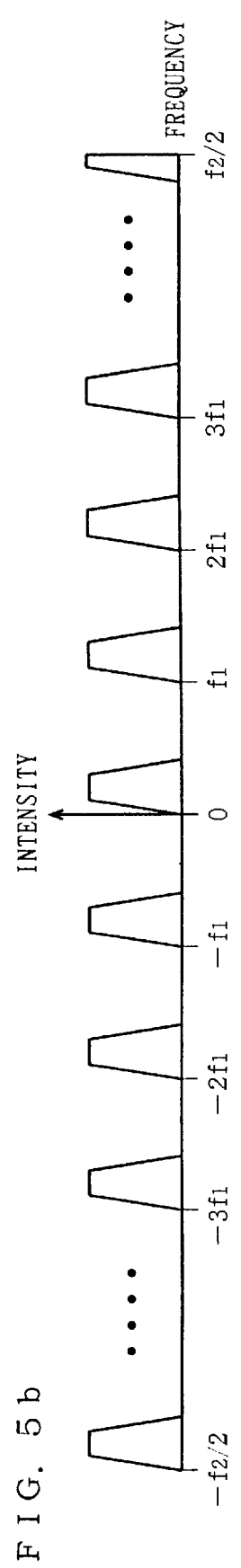

Furthermore, when the spectrum of the first discrete signal is centered at an arbitrary frequency as shown in FIG. 5a, the center of the spectrum of the second discrete signal, obtained by sampling the first discrete signal at $f_2$, appears at positions as shown in FIG. 5b. These positions are obtained as integral multiples of $f_1$ based on the center frequency of the first discrete signal. That is, the center of the spectrum of the second discrete signal appears at each multiple of $f_1$, allowing the second discrete signal to be arbitrarily shifted within the frequency bandwidth of $f_1$. Therefore, when the spectrum of the first discrete signal is centered at an arbitrary frequency, it is possible to independently set $f_1$ and $f_c$.

Figure 6:
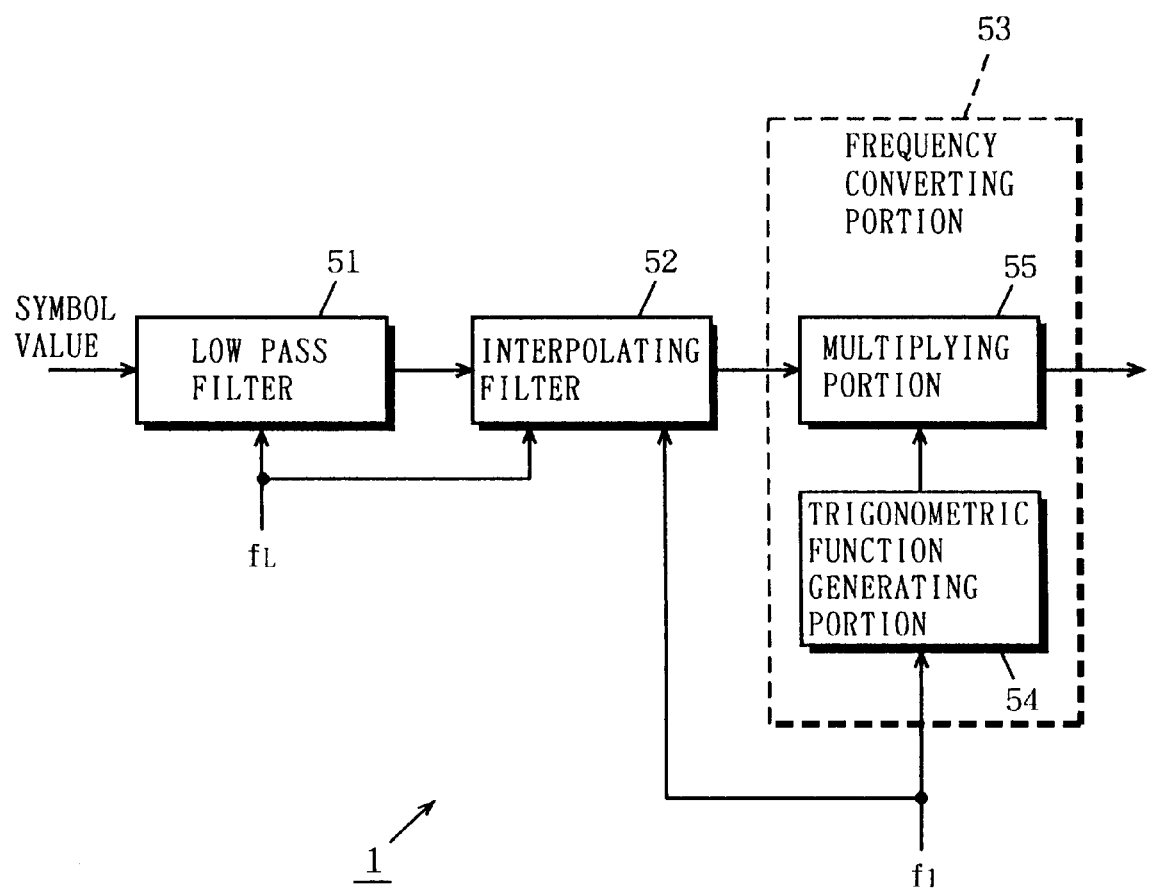
FIG. 6 is a block diagram showing the detailed structure of the low frequency signal generating portion 1 shown in FIG. 1.

Described next is an example of a structure of the low frequency signal generating portion 1, as shown in FIG. 6. In FIG. 6, the low frequency signal generating portion 1 includes a low pass filter 51, an interpolating filter 52, and a frequency converting portion 53. Furthermore, the frequency converting portion 53 has a multiplying portion 55 and a trigonometric function generating portion 54 (refer to the portion surrounded by a dotted line in FIG. 6).

The low pass filter 51 executes root roll off filtering and the like, with respect to a symbol value of a transmission signal inputted from an outside source, and then outputs a band-limited signal obtained by sampling the symbol value after filtering the symbol value of the transmission signal at a sampling rate $f_L$.

However, when the symbol value is previously band-limited, that is, when a band-limited signal is directly inputted into the low frequency signal generating portion 1, the low pass filter 51 is not required.

The interpolating filter 52 executes filtering to pass a low frequency portion of the band-limited signal at a sampling rate $f_1$ inputted from the low pass filter 51 or the outside source, thereby interpolating the inputted band-limited signal at the first sampling rate $f_1$. That is, the interpolating filter 52 converts the sampling rate of the band-limited signal from $f_L$ to $f_1$. An output signal from the interpolating filter 52 has the same spectrum as is shown in FIG. 3a. Here, typically, $f_L$ is obtained by dividing $f_1$ by an arbitrary integer, that is, $f_L < f_1$. In this way, by increasing the sampling rate, an interval in the spectrum appearing at the output signal of the interpolating filter 52 is sampled at $f_2$ (refer to FIG. 2b) is widened. Thus, a moderate characteristic is enough for the characteristic of the band pass filter included in the following band pass portion 2, thereby allowing for a small size of the band pass filter.

When the band-limited signal is originally sampled at a high $f_L$, since the interval in the spectrum appearing when sampled at $f_2$ becomes high, a signal with the spectrum shown in FIG. 3a can be obtained without converting the sampling rate, and thus, the interpolating filter 52 is not required.

The trigonometric function generating portion 54, included in the frequency converting portion 53, generates a trigonometric function with a prescribed frequency. As describe above, there are cases where the first discrete signal has an arbitrary center frequency other than "0" (refer to FIG. 5a). The frequency of the above trigonometric function defines the first discrete signal's center frequency.

The multiplying portion 55, included in the frequency converting portion 53, multiplies the output signal of the interpolating filter 52 by the trigonometric function outputted from the trigonometric function generating portion 54 shifting the center frequency of the output signal.

Figure 12:
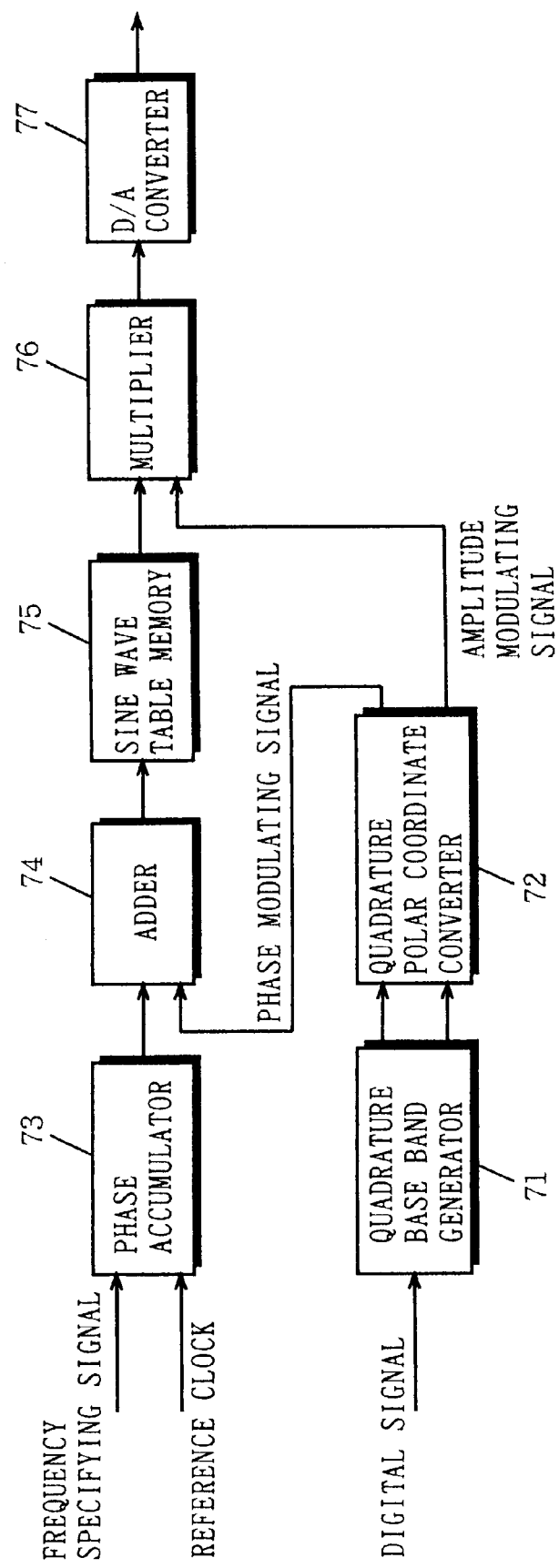
FIG. 12 is a block diagram showing the structure of a conventional modulator disclosed in Japanese Patent Laying-Open No. 6-152675.
Figure 13:
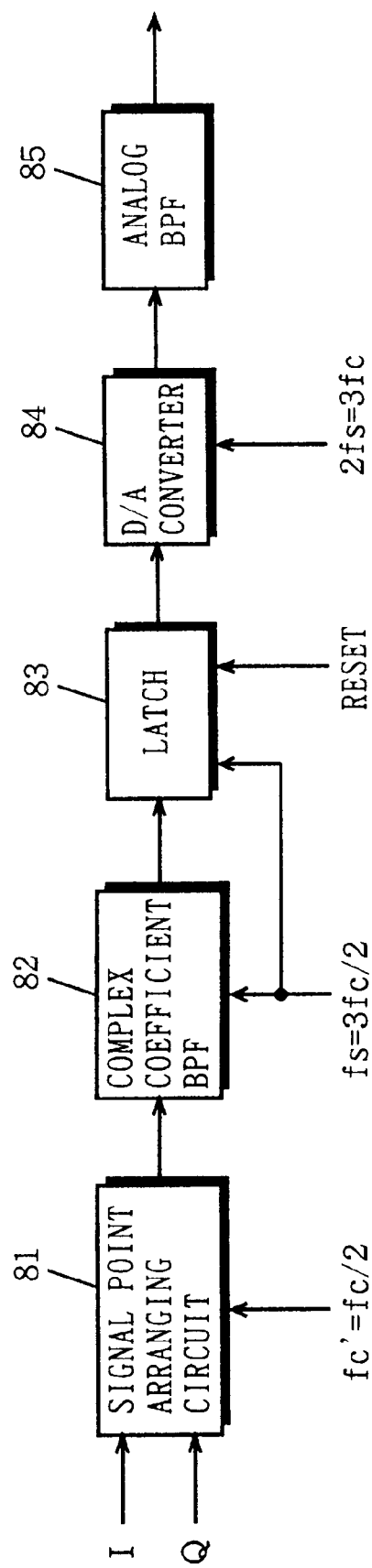
FIG. 13 is a block diagram showing the structure of a conventional modulator disclosed in Japanese Patent Laying-Open No. 6-244883.

In this way, the trigonometric function generating portion 54 and the multiplying portion 55 operate at $f_1$ which is lower than $f_2$, the final sampling rate. On the other hand, it is required for the first prior art modulator (refer to FIG. 12) to operate the phase accumulator 73 and the sine wave table memory 75, which correspond to the trigonometric function generating portion 54, at a clock rate which satisfies the equation $f_2 > 2(f_c + B)$. Thus, the trigonometric function generating portion 54 and the multiplying portion 55 of the present modulator can make the circuit size smaller and the power consumption lower compared to the first prior art modulator.

Further, the frequency converting portion 53 is only required when generating the first discrete signal as shown in FIG. 5a, and not required when generating the first discrete signal with a center frequency of "0" (refer to FIG. 3a).

Further, although the multiplying portion 55 has been described assuming that the output signal from the interpolating filter 52 is inputted thereto, there are cases, as is evident from the above, where the transmission signal is directly inputted from an outside source or the output signal from the low pass filter 51 is inputted. In both of these cases, the interpolating filter 52 is not required.

Described next is an example of a structure of the band pass portion 2. When the spectrum of the modulated signal generated by the present modulator is symmetrical as shown in FIG. 3c, like the spectrum of an amplitude modulating signal or a BPSK (Binary Phase Shift Keying) modulating signal, and the spectrum of the first discrete signal has a center at a frequency "0", the first discrete signal becomes a real signal. Therefore, at the band pass portion 2, a filter with real coefficients is used.

In other cases where the spectrum of the modulating signal is asymmetrical or where the spectrum of the first discrete signal has a center at an arbitrary frequency other than "0", as shown in FIG. 5a, the first discrete signal becomes a complex signal. Therefore, at the band pass portion 2, a filter with complex coefficients has to be used. However, since the frequency components selected by the band pass portion 2 are greater than "0" and less than $f_2/2$, it is sufficient to output from the band pass portion 2, either the real components or the imaginary components among the outputs from the complex coefficient filter.

Figure 7:
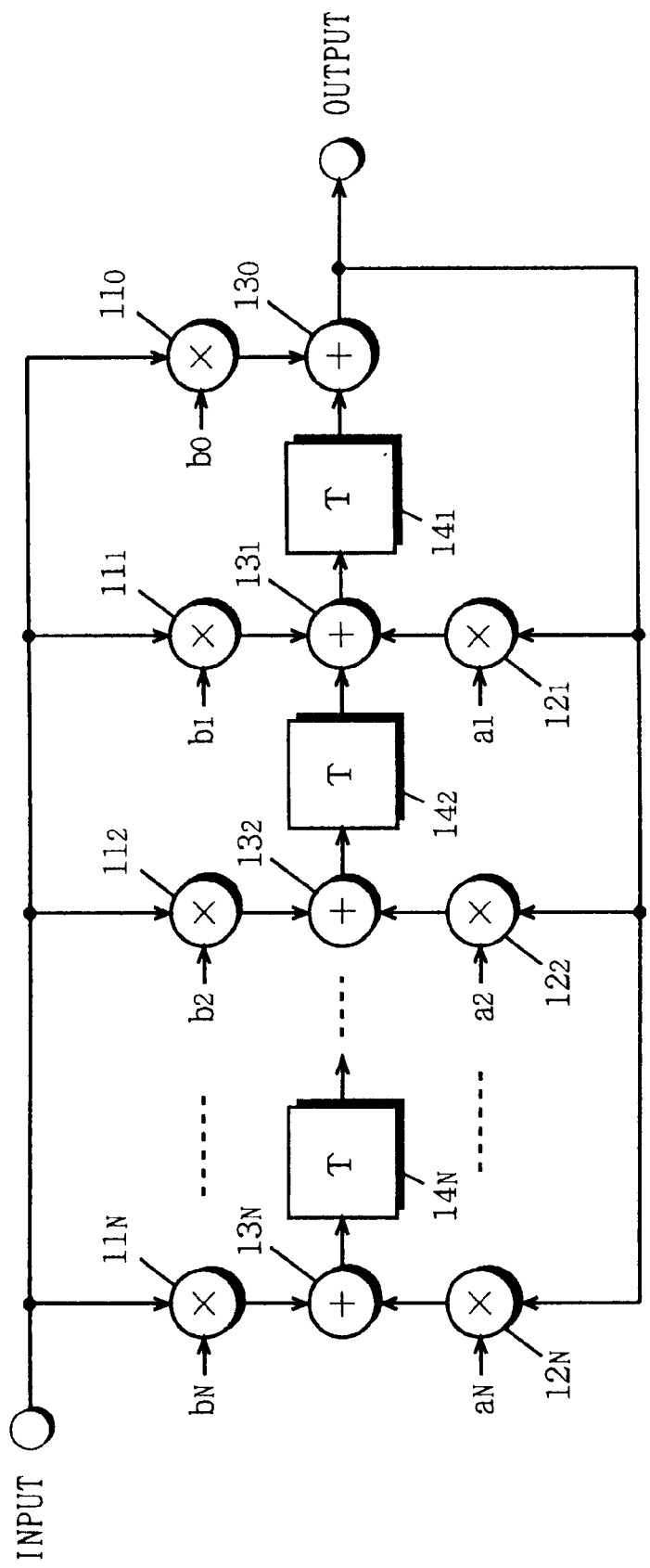
FIG. 7 is a block diagram showing the detailed structure of an IIR filter which is an example of a structure of the band pass portion 2 shown in FIG. 1.

Specifically, the band pass portion 2 can comprise an IIR (Infinite Impulse Response) filter as shown in FIG. 7. In FIG. 7, the IIR filter includes multipliers $11_o$ to $11_N$ for multiplying each input by coefficients $b_o$ to $b_N$, multipliers $12_1$ to $^{12}N$ for multiplying each feedback value of output by coefficients $a_1$ to $a_N$, adders $13_o$ to $13_N$ for adding a plurality of input values, and delay elements $14_1$ to $14_N$ for giving a delay T to the input values. The adder $13_N$ outputs a value obtained by adding two multiplied values inputted from the multiplier $11_N$ and the multiplier $12_N$ to the delay element $14_N$. The adders $13_{(N-1)}$ to $13_1$ add the two multiplied values inputted from the multipliers $11_{(N-1)}$ to $11_1$ and multipliers $12_{(N-1)}$ to $12_1$ and values inputted from delay elements $14_n$ to $14_2$ to output the result to the delay elements $14_{(N-1)}$ to $14_1$, respectively. The adder $13_o$ adds a multiplied value inputted from a multiplier $11_o$ and a value inputted from a delay element $14_1$, and as a result, an output of the IIR filter is obtained. Further, since the IIR filter performs the above operation at the second sampling rate $f_2$, when the first discrete signal is inputted, the IIR filter selects only components which exist within a prescribed frequency band in the spectrum included in the second discrete signal (refer to FIG. 3b and FIG. 5b) to generate a modulated signal.

Also, for the IIR filter shown in FIG. 7, variations in the output values are susceptible to coefficients $a_1$ to $a_N$ and $b_1$ to $b_N$, and therefore, the accuracy of operating elements used in the construction of the filter have to be high. However, since the number of taps N of the IIR filter may be small, when the operating elements used for the filter have a high degree of accuracy, the size of the filter can be small.

Figure 8:
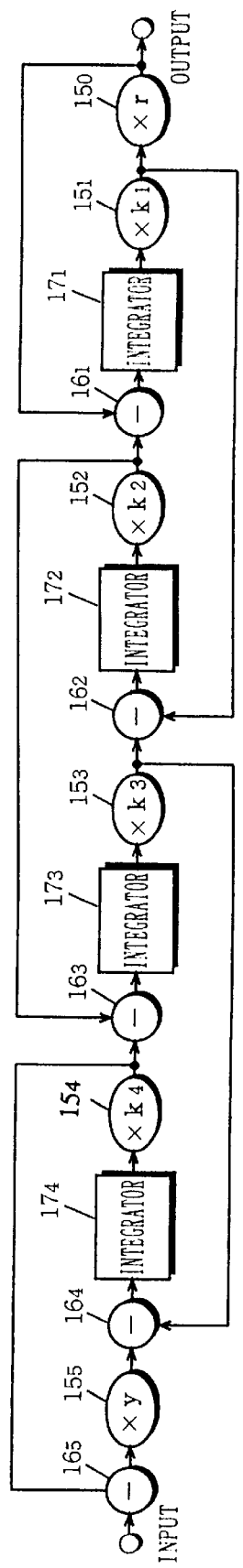
FIG. 8 is a block diagram showing the detailed structure of a leapfrog filter, which is an example of a structure of the band pass portion 2 shown in FIG. 1.
Figure 9:
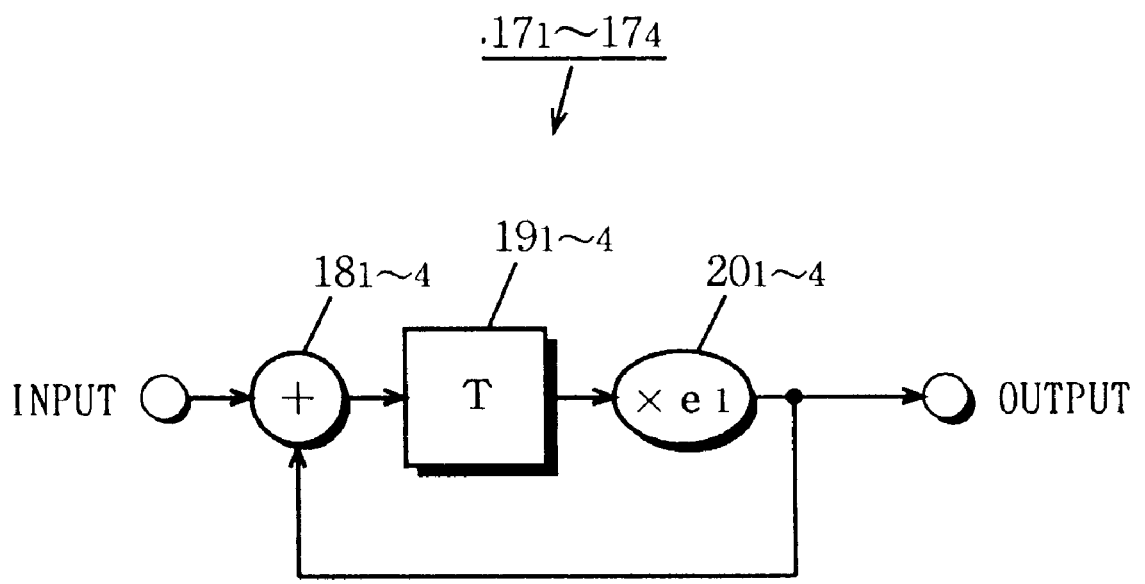
FIG. 9 is a block diagram showing the detailed structure of each integrator 17 included in the leapfrog filter shown in FIG. 8.

A type of the IIR filter described above is disclosed in "Analog Filter Design" (written by M. E. Van Valkenburg) as a leapfrog filter, as shown in FIG. 8 with digital signal processing. The leapfrog filter includes multipliers $15_0$ to $15_5$, subtracters $16_1$ to $16_5$, and integrators $17_1$ to $17_4$ Further, in the leapfrog filter, four state variables are used, and the integrators $17_1$ to $17_4$ hold one of the state variables each. The integrators $17_1$ to $17_4$ have, as shown in FIG. 9, adders $18_1$ to $18_4$, delay elements $19_1$ to $19_4$, and multipliers $20_1$ to $20_4$, respectively. The adders $18_1$ to $18_4$ add an input value and a feedbacked output value (output from the multipliers $20_1$ to $20_4$, respectively). The delay elements $19_1$ to $19_4$ give a delay value T to the output value from the adders $18_1$ to $18_4$, respectively. The multipliers $20_1$ to $20_4$ multiply the output value from the delay elements $19_1$ to $19_4$, respectively, by a coefficient e, and then output the results.

FIG. 8 is now referred to again. A coefficient r of the multiplier $15_0$, and a coefficient y of the multiplier $15_5$ correspond to an output step resistance and an input step resistance, respectively, when the filter is formed as an analog filter. Further, coefficients $k_1$ and $k_3$ of the multipliers $15_1$ and $15_3$, respectively, correspond to an inductance of the analog filter and coefficients $k_2$ and $k_4$ of the multipliers $15_2$ and $15_4$ correspond to a capacitance of the analog filter. The filter operates by feedbacking outputs from the multipliers $15_1$ to $15_4$ to the subtracters $16_1$ to $16_5$.

Also, like the IIR filter shown in FIG. 7, the leapfrog filter acting as the band pass portion 2 selects components of the first discrete signal which exist in a prescribed frequency band from the spectrum included in the second discrete signal (refer to FIG. 3b and FIG. 5b) generated simply by inputting the first discrete signal and generating a modulated signal.

Also, variations in the output values of the leapfrog filter are less susceptible to the coefficients of the filter than general IIR filters. Therefore, the accuracy of the operating elements used in the construction of the leapfrog filter can be lower than those operating elements use in the general IIR filter.

Figure 10:
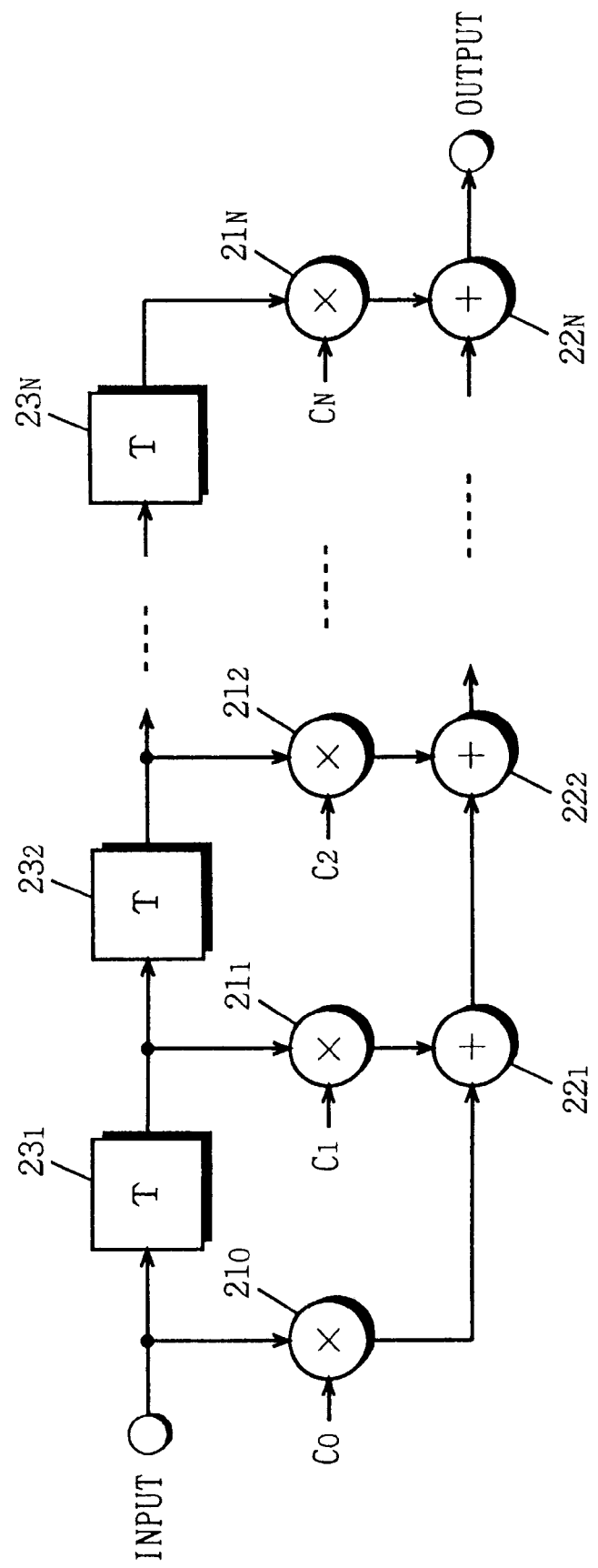
FIG. 10 is a block diagram showing the detailed structure of an FIR filter, which is an example of a structure of the band pass portion 2 shown in FIG. 1.

Further, the band pass portion 2 can be created by using an FIR (Finite Impulse Response) filter as shown in FIG. 10. In FIG. 10, the FIR filter is composed of N taps, including multipliers $21_0$ to $21_N$ for multiplying each respective input value by coefficients $c_0$ to $C_N$ and outputting the results, delay elements $23_1$ to $23_N$ for giving each respective input value a delay T and then outputting the results, and adders $22_1$ to $22_N$ for adding a plurality of respective input values and outputting the results. As is evident from FIG. 10, in the FIR filter, the multiplier $21_0$ multiplies an input value by the coefficient $c_o$, and the multipliers $21_1$ to $21_N$ multiplies output values from the delay elements $23_1$ to $23_N$ by the coefficients $c_1$ to $C_N$, respectively. The delay element $23_i$ (i is not less than 2) gives the output value of the delay element $23_{(i-1)}$ the delay T. Then, the results obtained by multiplying the multipliers $21_o$ to $21_N$ are synthesized by the adders $22_1$ to $22_N$ to become an output of the FIR filter.

Further, like the IIR filter shown in FIG. 7, when the first discrete signal is inputted, the FIR filter, acting as the band pass portion 2 selects only the components of the first discrete signal which exist in a prescribed frequency band in the spectrum of the second discrete signal (refer to FIG. 3b and FIG. 5b) to generate a modulated signal.

Also, when the FIR filter is applied to the band pass portion 2, a large number of taps N is required. However, since the accuracy of the operating elements used in the construction of the FIR filter can be as low as the accuracy secured at the input/output of the band pass portion 2, it is possible to operate the modulator at a high speed.

FIG. 10 shows the structure of the FIR filter, the number of multipliers in a practical circuit can be smaller than that shown in the drawing. That is, the second discrete signal generated in the FIR filter has a signal series in which most of the signals show "0", as shown in FIG. 2b. Before being inputted into the multipliers $21_o$ to $21_N$, the second discrete signal is delayed by the delay element of each preceding step. Therefore, not all of the multipliers 21 simultaneously output the results obtained by multiplying by a non-"0". Thus, in view of the miniaturization of the modulator, it is effective to construct the FIR filter with a small number of multipliers 21 and to perform filtering as switching to the multiplier 21 which outputs the result obtained by multiplying by a non-"0".

Further, when the IIR filter is used as the band pass portion 2, amplitude and phase characteristics of the output signal can be disturbed by the frequency. On the other hand, when the FIR filter is used, just the amplitude characteristics of the output signal can be disturbed by the frequency. When the low frequency signal generating portion 1 (refer to FIG. 1) includes the low pass filter 51 (refer to FIG. 6) and the frequency pass characteristics of the filter 51 have characteristics opposite to the above disturbances, it is possible to eliminate the disturbances in the amplitude and phase characteristics when the modulator is viewed as a whole.

In the band pass portion 2, when it includes either the IIR filter or the FIR filter, the center frequency $f_c$ can be freely varied by rewriting each of the coefficients. Described below are values to be set as the coefficients of the IIR and FIR filters. Generally, in order to realize the above IIR and FIR filters, an original filter having the same frequency pass characteristics as that of the filters and whose center frequency is "0" is planned and thereby coefficients of the original filter are obtained. The coefficients of the original filter are then multiplied by, $S_k$ shown in the following equation (1) and the results are taken as the coefficients of the IIR or FIR filter.

$$s_k = \cos 2\pi k f_c/f_2 + j \sin 2\pi k f_c/f_2 \quad (1)$$

The variable k is a relative integer indicating the number of sample delays when the input signal is multiplied by the coefficient. For example, when $s_o$ is used, it is possible to obtain $b_o$ (refer to FIG. 7) and $c_o$ (refer to FIG. 10), and when $s_1$ is used, it is possible to obtain $a_1$ and $b_1$ (refer to FIG. 7), and $c_1$ (refer to FIG. 10). The other coefficients can be obtained in the same manner. $f_c$ is a center frequency of the modulating signal, $f_2$ is the second sampling rate, and j is the imaginary unit.

Since multiplying the coefficients of the original filter by $s_k$ with the multiplying portion 55 corresponds to multiplying by the trigonometric function as phases are varied by a prescribed increase, the process is the same as a frequency conversion process by the frequency converting portion 53. Thus, when the low frequency signal generating portion 1 includes the frequency converting portion 53, the frequency conversion portion 53 can be used as a circuit for rewriting the coefficients of the IIR or FIR filter comprising the band pass portion 2. Described below is a second embodiment of the modulator with such a structure referring to FIG. 11 which shows its block structure.

Second Embodiment

Figure 11:
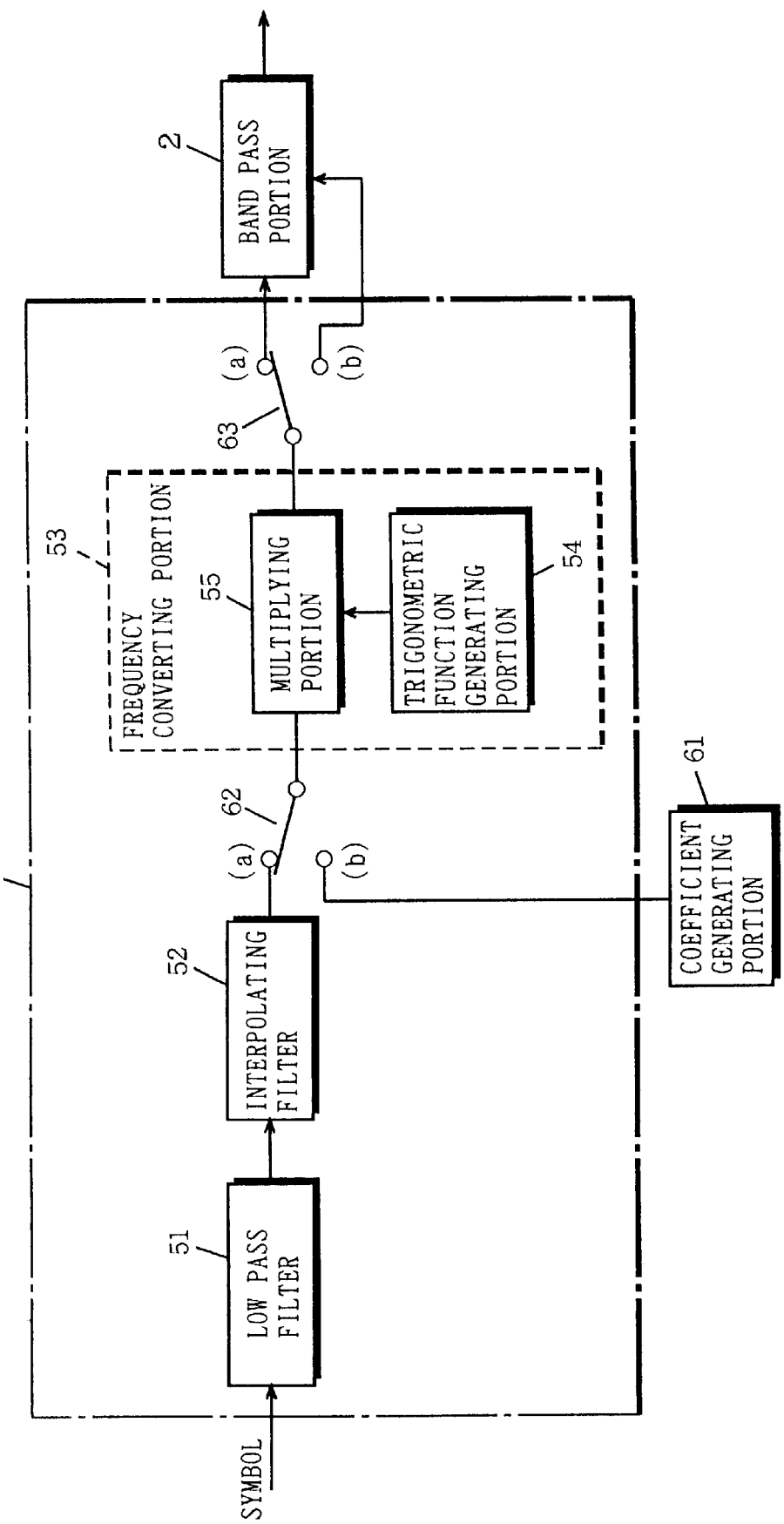
FIG. 11 is a block diagram of a modulator according to a second embodiment of the present invention.

In FIG. 11, the modulator differs from the one in FIG. 1 in that it further includes a coefficient generating portion 61. Since the general structure, except for the coefficient generating portion 61, is the same as shown in FIG. 1, corresponding structural parts are given the same reference numerals and their description is omitted. Further, in FIG. 11, the low frequency signal generating portion 1 differs only in that it further includes switches 62 and 63, compared to the low frequency signal generating portion 1 shown in FIG. 6. Thus, the other corresponding structural parts are given the same reference numerals and their description is omitted.

The coefficient generating portion 61 stores the coefficients of the original filter obtained as described above. A terminal (a) of switch 62 is connected to the interpolating filter 52, a terminal (b) of the switch 62 is connected to the coefficient generating portion 61, and the interpolating filter 52 or the coefficient generating portion 61 is connected to the frequency converting portion 53 by switching the switch 62. Further, a terminal (a) of switch 63 is connected to a signal input terminal of the band pass portion 2, a terminal (b) of switch 63 is connected to a coefficient input terminal of the band pass portion 2, and the signal input terminal or the coefficient input terminal is connected to the frequency converting portion 53 by switching the switch 63.

Described next is operation of the modulator. When generating a modulating signal, both of the switches 62 and 63 select their respective terminal (a) connecting the interpolating filter 52 and the frequency converting portion 53. In this arrangement, the operation of the modulator, is evident from the first embodiment, and thus its description is omitted.

However, when varying the center frequency of the modulating signal, both of the switches 62 and 63 select their respective terminal (b) connecting the coefficient generating portion 61 and the frequency converting portion 53. As a result, the coefficients of the original filter are outputted from the coefficient generating portion 61 to the multiplying portion 55. A trigonometric function is outputted from the trigonometric function generating portion 54 to the multiplying portion 55, and the multiplying portion 55 multiplies the coefficients of the original filter by the trigonometric function to generate and output coefficients for the IIR or FIR filter comprising the band pass portion 2. The coefficients generated in the above manner are outputted to the band pass portion 2 and set in a register which stores the coefficients of the IIR filter, FIR filter, or the like.

Here, described more specifically, is the operation in which the multiplying portion 55 calculates the coefficients for the IIR or FIR filter. The multiplying portion 55 has to calculate the coefficients $a_1$ to $a_N$ and $b_o$ to $b_N$ when the IIR filter shown in FIG. 7 is used, the coefficient e1 when the leapfrog filter shown in FIG. 8 and FIG. 9 is used, and the coefficients $c_o$ to $C_N$ when the FIR filter shown in FIG. 10 is used. All of these coefficients are general called $f_k$ (k=0, 1, ..., N). Further, the coefficients of the original filter are generally called $g_k$. At this time, the multiplying portion 55 uses $s_k$ shown in the above equation (1) to calculate $f_k = g_k \cdot s_k$, and outputs the result to the band pass portion 2.

As described above, in the modulator according to the present embodiment, the trigonometric function generating portion is not required, or if the trigonometric function generating portion is used, its operating rate is low, allowing for a small circuit size and low power consumption. Further, the center frequency of the modulating signal can be varied by changing the coefficients of the filter (IIR or FIR) within the band pass portion 2 as required. Further, although the modulator can be conveniently integrated if the structural parts are constructed using digital elements, they may be constructed with analog elements.

While the invention has been described in detail, the foregoing description is illustrative in all aspects and not restrictive. It is understood that numerous other modifications and variations can be devised without departing from the scope of the invention.

What is claimed is:

1. A device comprising:

discrete signal generating means for sampling a transmission signal inputted from an outside source at a first sampling rate and generating a discrete signal; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means comprising an IIR filter, wherein said IIR filter operates at said second sampling rate and executes said band selection.

2. A device comprising:

discrete signal generating means for sampling a transmission signal inputted from an outside source at a first sampling rate and generating a discrete signal; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means comprising a leapfrog IIR filter, wherein said leapfrog IIR filter operates at said second sampling rate and executes said band selection.

3. A device comprising:

discrete signal generating means for sampling a transmission signal inputted from an outside source at a first sampling rate and generating a discrete signal; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means comprising a FIR filter, wherein said FIR filter operates at said second sampling rate and executes said band selection.

4. A device comprising:

discrete signal generating means for sampling a transmission signal inputted from an outside source at a first sampling rate and generating a discrete signal, said discrete signal generating means comprising a low pass filter, operating at said first sampling rate, for passing only a signal which exists at low frequencies; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means including an IIR filter or a FIR filter, and said low pass filter has a frequency pass characteristic capable of compensating for a frequency pass characteristic of said IIR filter or said FIR filter.

5. A device comprising:

discrete signal generating means for sampling a transmission signal inputted from an outside source at a first sampling rate and generating a discrete signal, said discrete signal generating means comprising:

a low pass filter for passing only a low frequency signal, and an interpolating filter for interpolating said low frequency signal passed by said low pass filter at said first sampling rate; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means including an IIR filter or a FIR filter, and said low pass filter has a frequency pass characteristic of said IIR filter or said FIR filter.

6. A device comprising:

discrete signal generating means for sampling a transmission signal inputted from an outside source at a first sampling rate and generating a discrete signal, said discrete signal generating means comprising:

a low pass filter, operating at said first sampling rate, for passing only a low frequency signal, trigonometric function generating means for generating a trigonometric function with a prescribed frequency, and multiplying means for multiplying said low frequency signal from said low pass filter by said trigonometric function generated in said trigonometric finction generating means; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means including an IIR filter or a FIR filter, and said low pass filter has a frequency pass characteristic capable of compensating for a frequency pass characteristic of said IIR filter or said FIR filter.

7. A device comprising:

discrete signal generating means for sampling a transmission signal inputted from an outside source at a first sampling rate and generating a discrete signal, said discrete signal generating means comprising:
- a low pass filter for passing only a low frequency signal,
- an interpolating filter for interpolating said low frequency signal from said low pass filter at said first sampling rate,
- trigonometric function generating means for generating a trigonometric function with a prescribed frequency, and
- multiplying means for multiplying said low frequency signal which has been interpolated by said interpolating filter by said trigonometric function generated in said trigonometric function generating means; and band passing means, operating at a second sampling rate which is higher than said first sampling rate, for executing a band selection by passing a portion of said discrete signal which exists in a prescribed frequency band, wherein said prescribed frequency band of said band passing means has a center frequency which is not zero and said portion of said discrete signal is an aliasing component of said discrete signal, said band passing means including an IIR filter or a FIR filter, and said low pass filter has a frequency pass characteristic capable of compensating for a frequency pass characteristic of said IIR filter or said FIR filter.

* * * * *